(12) United States Patent
Lerner et al.

(10) Patent No.: US 7,441,909 B2
(45) Date of Patent: Oct. 28, 2008

(54) OPTICAL ASSEMBLY FOR A PROJECTION SYSTEM

(75) Inventors: Scott Lerner, Corvallis, OR (US); James W. Ring, Blodgett, OR (US); Brett E. Dahlgren, Lebanon, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 282 days.

(21) Appl. No.: 11/040,347

(22) Filed: Jan. 20, 2005

(65) Prior Publication Data
US 2006/0158620 A1    Jul. 20, 2006

(51) Int. Cl.
*G03B 21/14* (2006.01)

(52) U.S. Cl. .................. 353/100; 353/102; 353/98; 348/744; 359/800

(58) Field of Classification Search ................ 359/641, 359/649–651, 657, 663, 720–722, 798–800, 359/726, 732–736; 353/74–77, 102, 97, 353/98, 122, 100; 348/794, 787–789, 745, 348/744
See application file for complete search history.

(56) References Cited

U.S. PATENT DOCUMENTS

| | | | |
|---|---|---|---|
| RE33,689 E * | 9/1991 | Nishioka | 359/708 |
| 5,155,822 A | 10/1992 | Doyle et al. | |
| 5,251,322 A | 10/1993 | Doyle et al. | |
| 5,467,154 A | 11/1995 | Gale et al. | |
| 5,692,820 A * | 12/1997 | Gale et al. | 353/77 |
| 5,969,875 A | 10/1999 | Sugawara et al. | |
| 6,091,550 A * | 7/2000 | Hayashi et al. | 359/649 |
| 6,169,636 B1 | 1/2001 | Kreitzer | |
| 6,188,524 B1 | 2/2001 | Hayashi et al. | |
| 6,520,646 B2 | 2/2003 | Rodriguez, Jr. et al. | |
| 6,568,814 B2 | 5/2003 | Rodriguez, Jr. et al. | |
| 6,671,102 B2 * | 12/2003 | Wada | 359/649 |
| 6,937,401 B2 * | 8/2005 | Sugano | 359/649 |
| 2001/0019454 A1 * | 9/2001 | Tadic-Galeb et al. | 359/649 |
| 2003/0137744 A1 | 7/2003 | Kuwa et al. | |
| 2003/0197954 A1 * | 10/2003 | Ikeda et al. | 359/726 |
| 2003/0231261 A1 | 12/2003 | Bassi et al. | |
| 2004/0141157 A1 | 7/2004 | Ramachandran et al. | |
| 2006/0028741 A1 * | 2/2006 | Kreitzer et al. | 359/793 |

FOREIGN PATENT DOCUMENTS

| EP | 1 422 543 A | 5/2004 |
|---|---|---|
| EP | 1422543 A1 * | 5/2004 |

* cited by examiner

*Primary Examiner*—Andrew T Sever

(57) ABSTRACT

An optical assembly for a projection system includes an objective lens and a retro-focus lens. Then objective lens and retro-focus lens share one or more lens elements. A method of projecting an image comprises directing light from a light source to one or more modulators and projecting a modulated light beam using an optical assembly that includes an objective lens and a retro-focus lens that share one or more lens elements.

22 Claims, 6 Drawing Sheets

OPTICAL ASSEMBLY FOR A PROJECTION SYSTEM

BACKGROUND

Projection systems are used to display images, both still pictures and motion picture video, in a wide variety of applications. For example, projection systems may be used in theaters and auditoriums to display images for a relatively large audience. Projection systems are also used in conference rooms and smaller venues for displaying presentations, charts, graphs and the like. Projection systems are also used in residences as entertainment systems, for example, in big screen television sets. Because projection systems are so widely used, there is a constant desire to produce projection systems that are less complicated, less expensive and more lightweight.

BRIEF DESCRIPTION OF THE DRAWINGS

The accompanying drawings illustrate various embodiments of the present invention and are a part of the specification. The illustrated embodiments are merely examples of the present invention and do not limit the scope of the invention.

Throughout the drawings, identical reference numbers designate similar, but not necessarily identical, elements.

DETAILED DESCRIPTION

The present specification describes an optics assembly for a short-throw projection system that is smaller, lighter and less expensive than previous systems. The assembly can be used, for example, in a rear-projection television set.

As used herein and in the appended claims, the term "image" will be understood to refer broadly to any still image, series of images or motion picture video that might be projected and displayed by a projector or projection system. The term "lens" may refer to a single lens or optical element, a plurality of lenses coupled together into a unitary lens, or several physically separate lenses.

Figure 1:
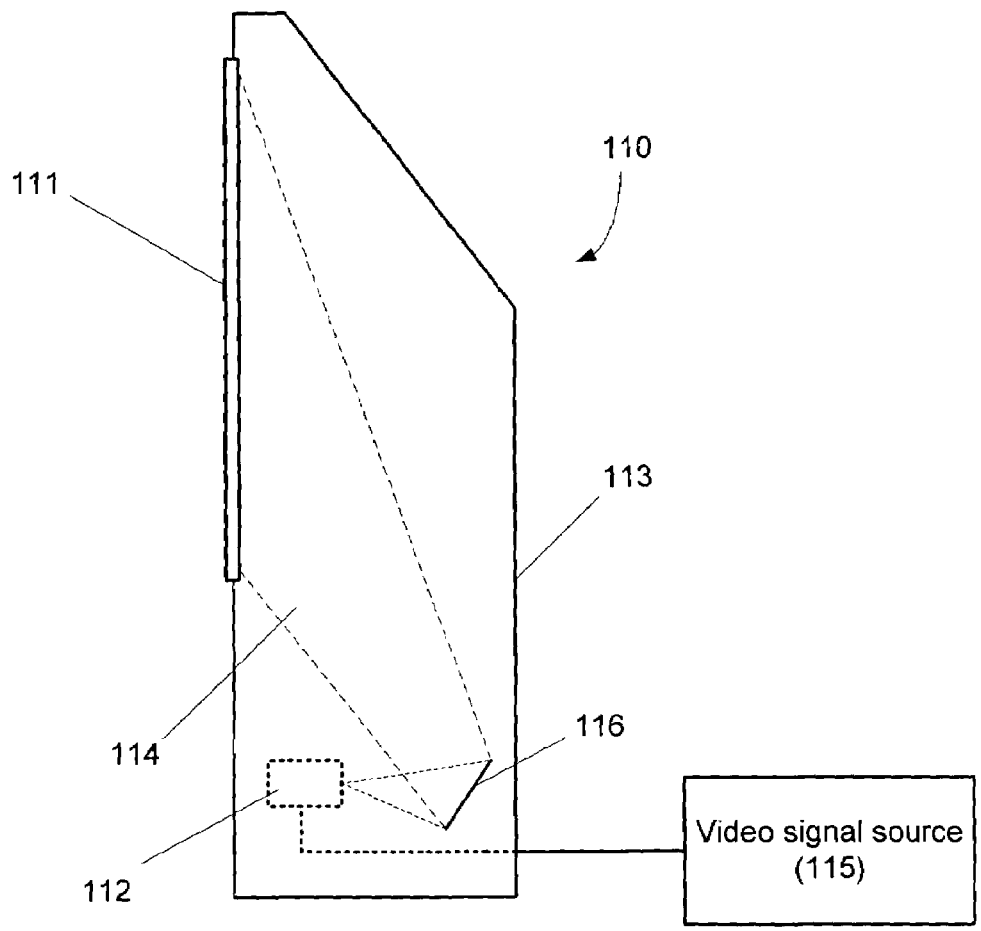
FIG. 1 is an illustration of a rear-projection television set incorporating an optics assembly according to principles described herein.

FIG. 1 is an illustration of a rear-projection television set incorporating an optics assembly according to principles described herein. As shown in FIG. 1, a rear-projection television set (110) includes a projection screen (111) on which the projected image is displayed. A projection system (112) projects an image onto the rear of the screen (111). Due to the nature of the screen (111), the image is visible through the screen (111) to an audience on the opposite side of the screen (111) from the projection system (112), hence the name "rear-projection" television. Typically, the screen (111) and projection system (112) are incorporated into a cabinet (113). As shown in FIG. 1, a turning mirror (116) may be used to direct the projection light beam from the projection system (112) to the screen (111). This can reduce the size of the cabinet (113).

A video signal source (115) provides an electronic signal to the projection system (112) of the television (110). The video signal source (115) may be any of a wide variety of signal sources, for example, a Digital Video (or Versatile) Disk (DVD) player, a Video Cassette Recorder (VCR), a cable or satellite set-top box, a terrestrial antenna, a computer, a camcorder, etc. Any device that outputs a video signal can serve as the video signal source (115).

The video signal output by the video signal source (115) carries data defining the images to be projected by the projection system (112). As noted above, the images of the video signal may be still pictures, a series of still pictures or motion picture video.

The video signal is used to drive a modulator or modulators in the projection system. A modulator, as will be described in more detail below, uses the video signal to selectively transmit, reflect or color portions of a projected light beam such that the light beam (114) is modulated with the image to be projected. The modulated light beam (114) is directed to the screen (111). A modulator may be, for example, a liquid crystal light modulator, a digital micromirror device or the like.

As shown in FIG. 1, in a rear-projection television (110), the distance between the projection system (112) and the screen (111) is relatively small as compared with, for example, a projector that projects an image to a screen or display surface across a room or auditorium. Consequently, the projection system (112) shown in FIG. 1 is known as a short-throw projection system because the distance between the projection system (112) and screen (111) is relatively small.

In addition to being a short-throw system, the projection system (112) is also an off-axis projection system. In an off-axis projection system, the light beam being modulated is not directed down the optical axis of the projection system over at least a portion of the projection path. Rather, the light beam travels along or parallel to the optical axis, but is shifted to the side of the axis. As will be explained and illustrated in more detail below, this allows light to move in both directions through a set of optics with an optical path in one direction on one side of the optical axis and an optical path in the opposite direction on the other side of the optical axis. This arrangement may also be referred to as a split-pupil system.

Conventionally, off-axis, short-throw projection systems have required optics meeting very stringent requirements. This has resulted in projection systems that are relatively expensive. The present specification describes an optics assembly for use in an off-axis, short-throw projection system that is significantly less expensive and also significantly lighter and less complicated.

Figure 2:
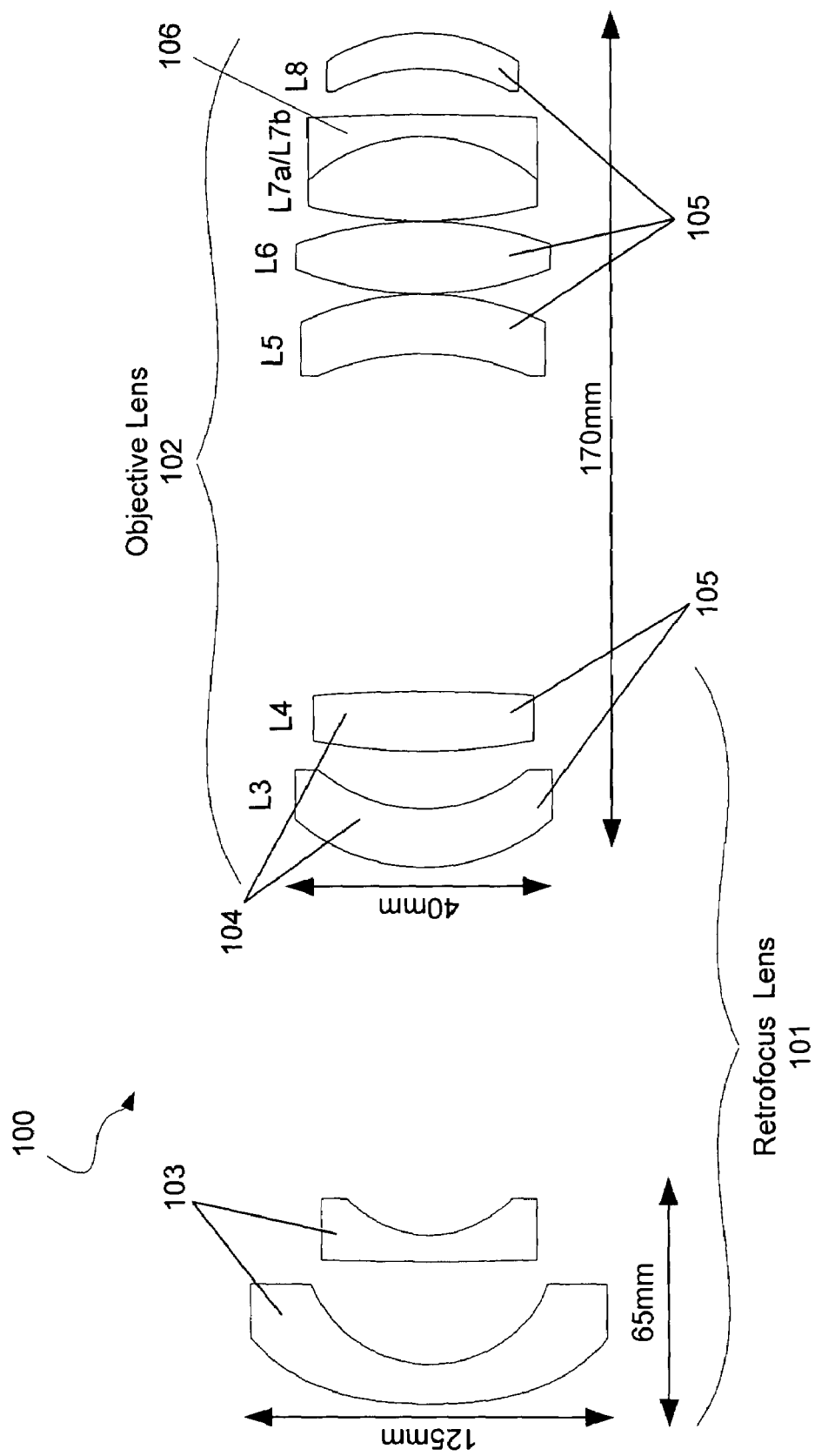
FIG. 2 is an illustration of an optics assembly for a short-throw projection system according to principles described herein.

FIG. 2 is an illustration of an optics assembly for a short-throw projection system according to principles described herein. As shown in FIG. 2, the optics assembly (100) includes an objective lens (102) and a retro-focus lens (101), with one or more lens elements being shared by the objective lens (102) and retro-focus lens (101). In the illustrated example, two lenses or lens elements (104) are shared by the objective lens (102) and retro-focus lens (101).

The retro-focus lens (101) includes a projection lens (103). As shown in FIG. 2, the projection lens (103) includes two aspheric lenses (103). These lenses (103) can be molded from a plastic or polymer to reduce the expense and weight of the assembly (100). For example, the projection lenses (103) may be made from Zeonex®. In other examples, the projection lenses (103) can be made from glass, e.g., BK7.

The objective lens (102) includes five singlets (105) and one doublet (106). These lenses (105, 106) may be made, for example, from glass. In one example, lens L3 is made of SF11 glass, lens L4 is made of BK7 glass, lens L5 is made of BK7 glass, lens L6 is made of FK5 glass, lens L7a is made of BK7 glass, lens L7b is made of SF11 glass and lens L8 is made of SF11 glass.

This arrangement results in an assembly (100) that is less expensive and less heavy than conventional systems. For example, the optics described above may have a total glass weight of only 200 g or less. The assembly (100) is also relatively compact. In the example shown in FIG. 2, the length of the objective lens may be only 170 mm, with a width of 40 mm. The projection lens (103) has a width of 125 mm, with a length of 65 mm. The back focal distance is less than 26.5 mm. There is a 1:2 throw ratio, and over a throw distance of 650 mm, the result is a 50 inch image, measured diagonally. Distortion is also minimized by the described design and may be, for example, less than 0.7%.

Figure 3:
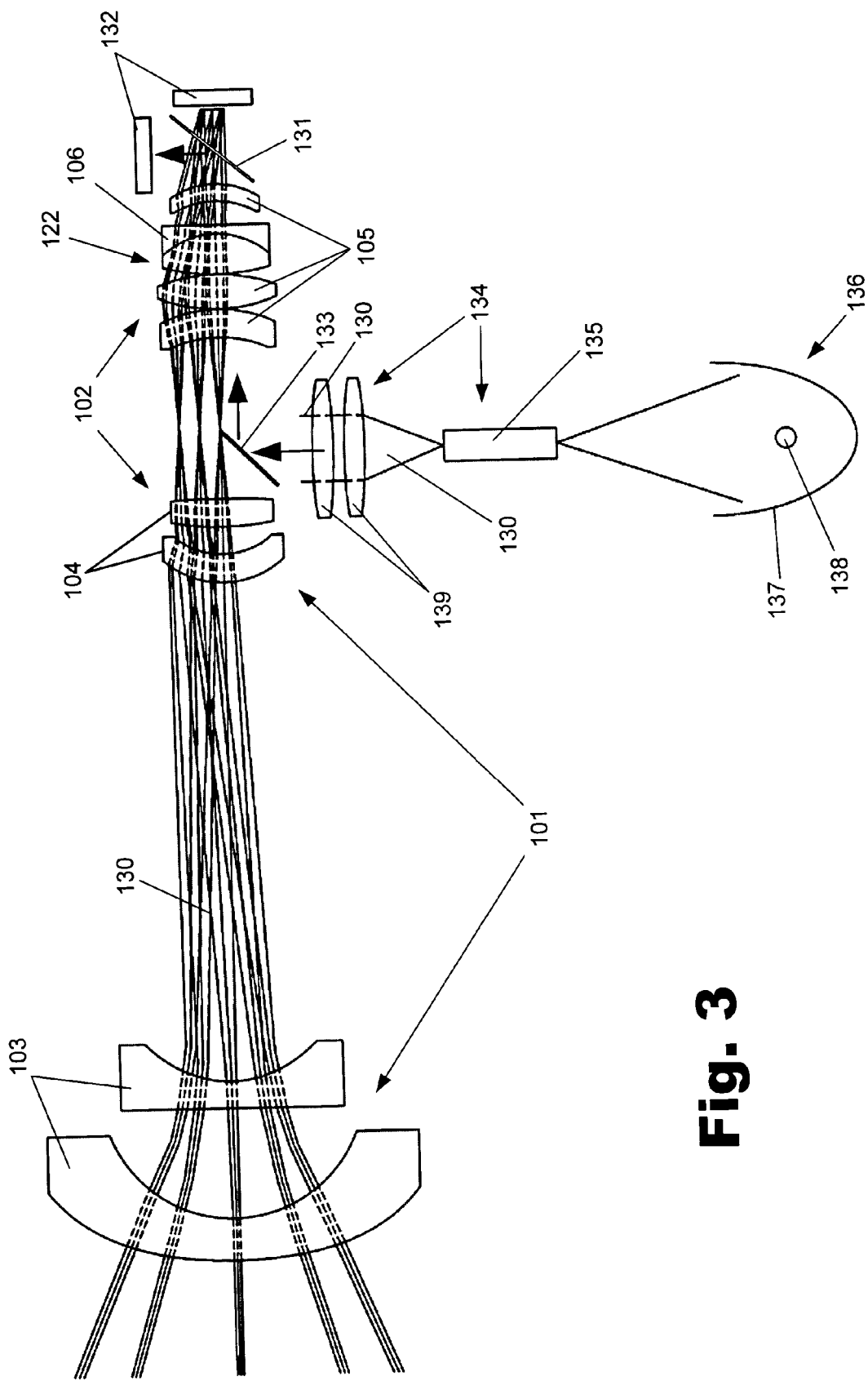
FIG. 3 is an illustration of a projection system incorporating the optics assembly of FIG. 2 according to principles described herein.

FIG. 3 is an illustration of a projection system incorporating the optics assembly of FIG. 2 according to principles described herein. As shown in FIG. 3, a light source (136) is used to generate a projection light beam. In some examples, the light source (136) includes a lamp (138). The lamp (138) may be, for example, an Ultra High Pressure or Performance (UHP) lamp. UHP projection lamps are often metal halide lamps, such as mercury vapor. The lamp (138) may be partially surrounded by a reflector (137) that collects and directs the light from the lamp (128) into the illumination optics (134).

As shown in FIG. 3, the illumination optics (134) may include an integrating bar (135) and a number of lenses (139). The integrating bar (135) homogenizes the light prior to the light being directed to the modulators (132) of the projection system. The lenses (139) may include one or more magnifying lenses and one or more collimating lenses. The lenses (139) of the illumination optics (134) collimate and direct the light emerging from the integration bar (135).

As shown in FIG. 3, after the light beam (130) exits the illumination optics (134), the light beam (130) is folded by a fold mirror (133) into the objective lens (102) of the assembly described above in connection with FIG. 2. The light beam (130) travels, off-axis, through the relay optics (122) of the objective lens (102).

The relay optics (122) of the objective lens (102) may include a number of lens elements such as an achromat and a telecentric lens, including a convex lens. The relay optics (122) deliver the light beam (130) to a splitter (131). The splitter (131) may be, for example, a cube, prism or plate, and may be dichroic or trichroic.

The splitter (131) splits the light beam (130), directing the light beam to two individual modulators (132). As described above, a modulator (132) is driven using the video signal representing the image to be displayed. The modulator (132) then selectively transmits, reflects or colors the light of the light beam to modulate the light beam to carry the desired image. Multiple modulators (132) are used, for example, to represent different color components of a color image, improve the contrast ratio or otherwise improve the clarity of the projected image.

After modulation, the splitter (131) directs the modulated light from both modulators (132) back through the objective lens (102) of the projection system. The modulated light again travels off-axis through the objective lens (102) and then through the retro-focus lens (101), including the projection lens (103), of the projection system. As a result, the desired image is then projected, for example, onto the screen of a rear-projection television as illustrated in FIG. 1 and described above.

Figure 4:
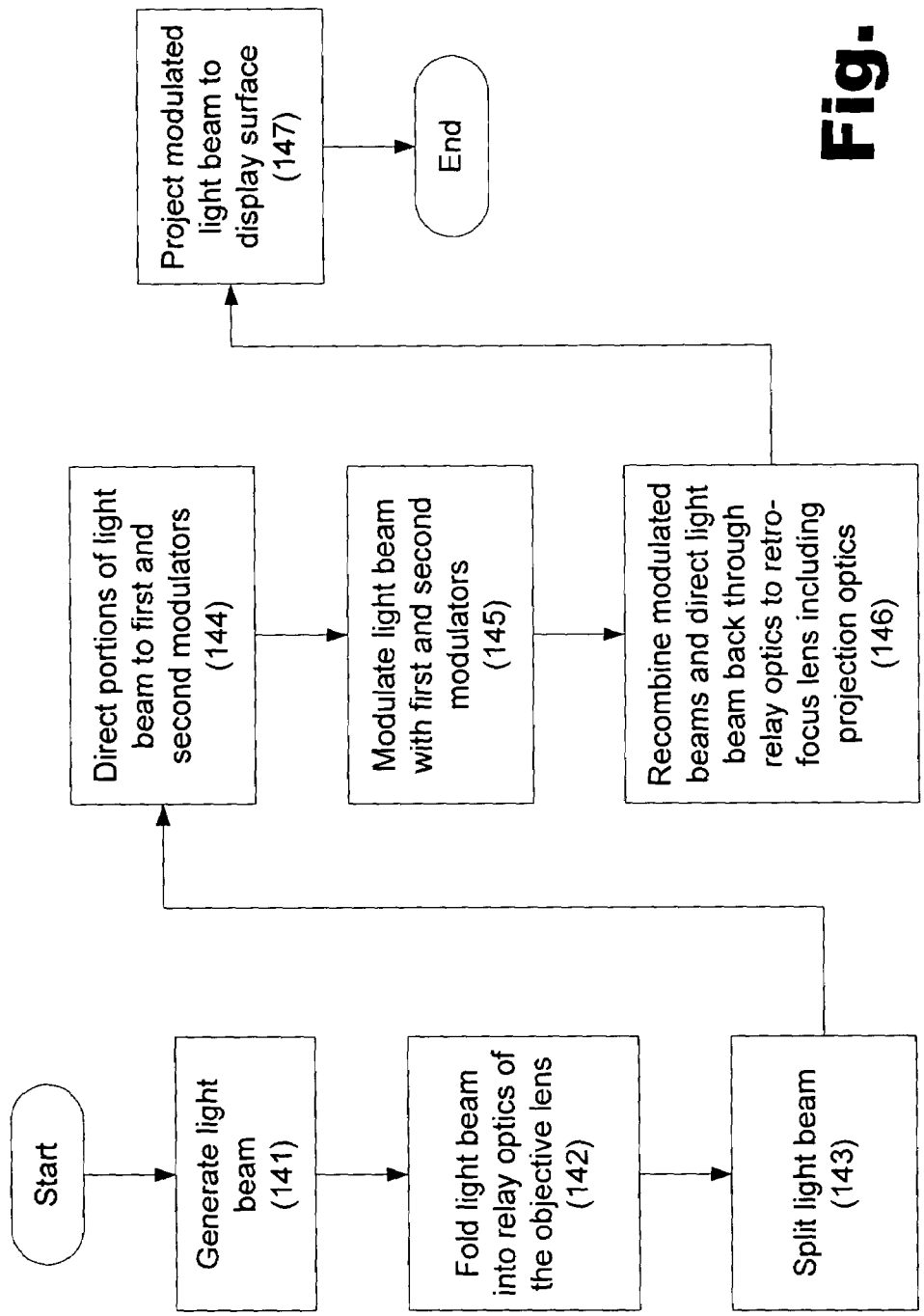
FIG. 4 is a flow chart illustrating the operation of the projection system illustrated in FIG. 3 according to principles described herein.

FIG. 4 is a flow chart illustrating the operation of the projection system illustrated in FIG. 3 according to principles described herein. As shown in FIG. 4, first the light beam is generated (step 141). As described above, this may be done with a lamp and reflector assembly. The generation of the light beam (step 141) may also include passing the beam through an integrating bar as described above to homogenize the light.

After the light beam is generated, the beam is folded into the relay optics of the objective lens (step 142). The relay optics of the objective lens direct the light to the modulator or modulators of the projection system.

As mentioned above, the use of multiple modulators can improve the resulting projected image. Consequently, the light beam is split (step 143). The split beam is then directed to both first and second modulators (step 144). As described above, a splitter or prism may be used to split the light beam and direct light to each of the two modulators The modulators operate roughly simultaneously to modulate portions of the light beam, which portions are then recombined (step 146).

The modulated light beam is then directed back through the relay optics of the objective lens to the retro-focus lens, including the projection optics (step 146). Finally, the projection optics project the modulated light beam onto a display or projection surface (step 147) such as the screen of a rear-projection television set.

Figure 5:
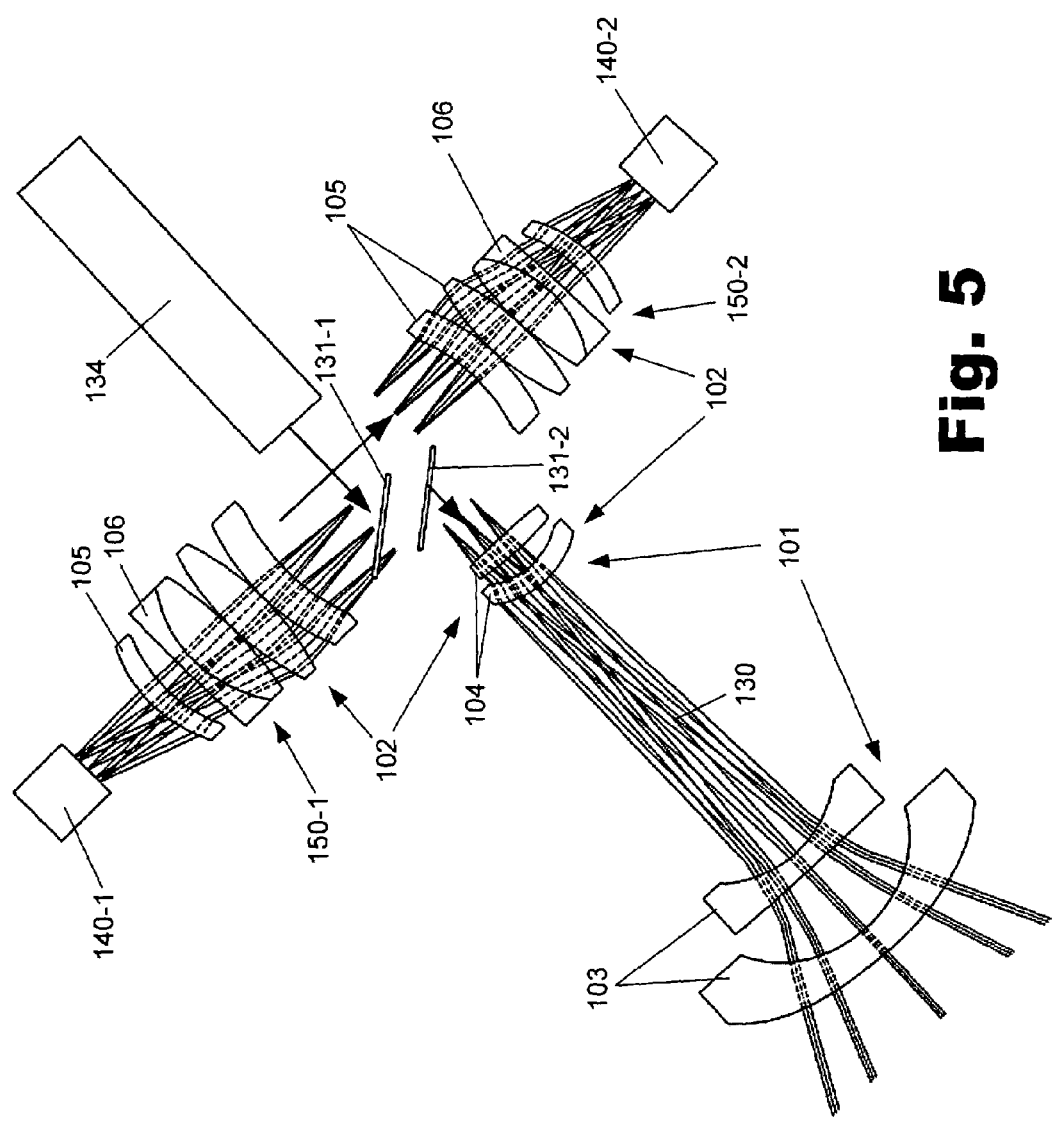
FIG. 5 is an illustration of another projection system incorporating the optics assembly of FIG. 2 according to principles described herein.

FIG. 5 is an illustration of another projection system incorporating the optics assembly of FIG. 2 according to principles described herein. As shown in FIG. 5, there may be two sets of relay optics so that additional modulators can be used to modulate the light beam.

The illumination optics are represented in FIG. 5 by block (134). As in the example of FIG. 3, the illumination optics may receive light from a light source, such as a lamp and reflector assembly. The illumination optics (134) may include an integrating bar and a number of lenses for directing the light to a first fold mirror (131-1).

The first fold mirror (131-1) folds the light beam (130) into a first set of relay optics (150-1). In the example of FIG. 5, the objective lens (102) includes two sets of relay optics (150-1 and 150-2) and the lenses (104) that are shared with the retro-focus lens (101).

The first set of relay optics (150-1) direct the light beam, off-axis, to a first modulator block (140-1). The first modulator block (140-1) may include, for example, a prism and two modulators, where the prism divides the light beam, directs light to both modulators and then recombines modulated light from both modulators in the manner described above in connection with FIG. 3. As will be appreciated by those skilled in the art, however, each modulator block (140) can contain various optical arrangements including different numbers of modulators.

The modulated light beam is then directed from the first modulator block (140-1) back through the first set of relay optics (150-1) and into a second set of relay optics (150-2). Again, the light beam (130) is transmitted through the relay optics (150) in an off-axis manner. The off-axis transmission permits two-way travel of the light through both sets of relay optics (150).

The second set of relay optics (150-2) direct the light beam to a second modulator block (140-2). This second modulator block (140-2) may be identical to the first modulator block (140-1), having a prism optically coupled to two modulators. However, the first and second modulator blocks need not be identical.

As will be appreciated by those skilled in the art, the various modulators in the example of FIG. 5 may be driven using the same or different video signals to provide a color or high quality projection image. The number of modulators used and the data sent to each modulator will be determined as best suits a particular application.

After being modulated by the second modulator block (140-2), the light beam is directed, off-axis, back through the second set of relay optics (150-2), to a second fold mirror (131-2). The second fold mirror (131-2) folds the modulated light beam into the retro-focus lens (101), including the projection lens (103). The light beam (130) is then projected to a display surface, such as the screen of a rear-projection television set.

Figure 6:
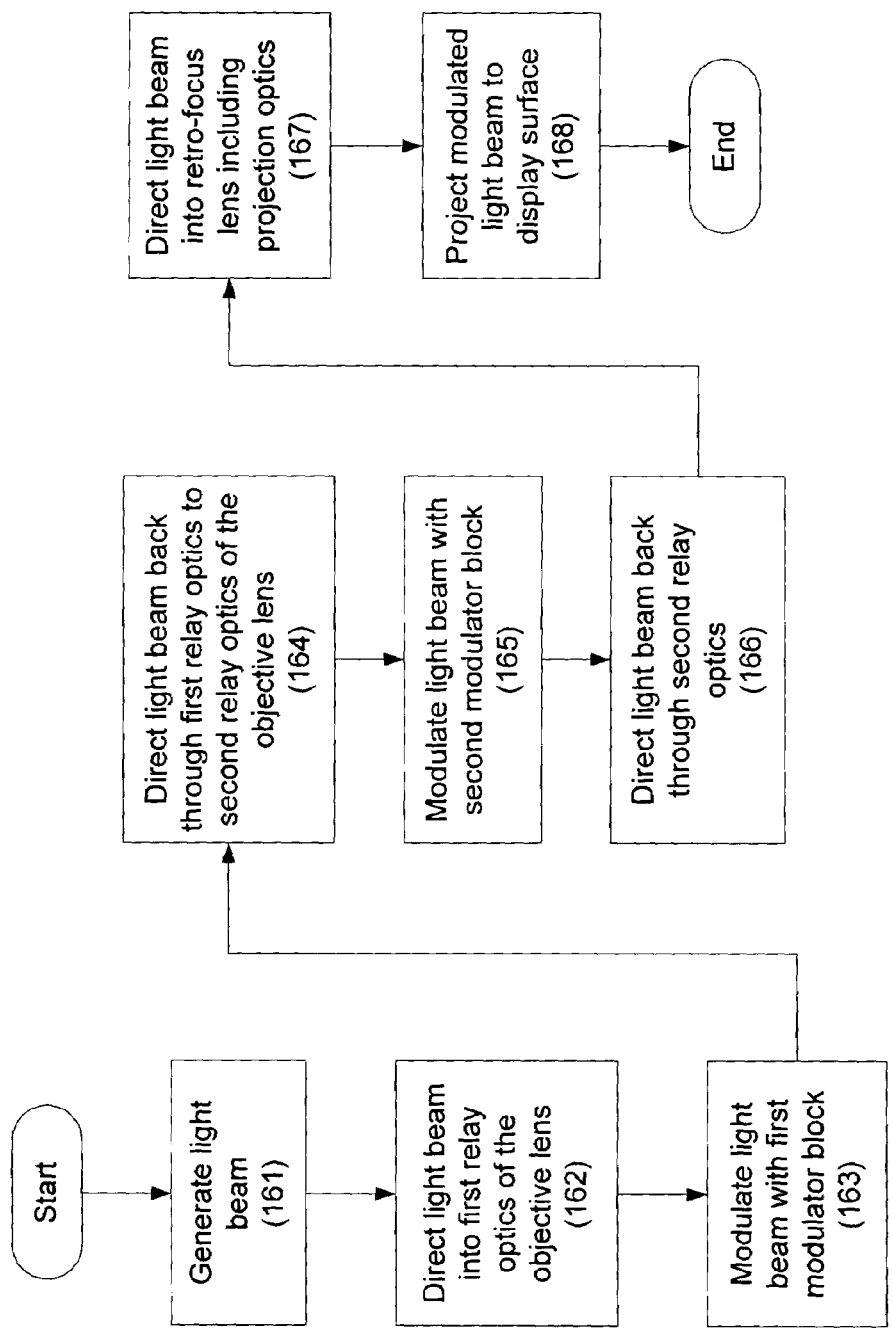
FIG. 6 is a flow chart illustrating the operation of the projection system illustrated in FIG. 5 according to principles described herein.

FIG. 6 is a flow chart illustrating the operation of the projection system illustrated in FIG. 5 according to principles described herein. As shown in FIG. 6, first the light beam is generated (step 161). As described above, this may be done with a lamp and reflector assembly. The generation of the light beam (step 161) may also include passing the beam through an integrating bar as described above to homogenize the light.

After the light beam is generated, the beam is folded into a first set of relay optics of the objective lens (step 162). The relay optics of the objective lens direct the light to the modulator or modulators of the projection system.

As mentioned above, the use of multiple modulators can improve the resulting projected image. Consequently, the light beam is directed to and modulated by a first modulator block which may include multiple modulators (step 163). As described above, a prism may be used to direct the light beam to each of two modulators in the modulator block, with the modulators operating simultaneously to modulate portions of the light beam which portions are then recombined by the prism.

The light beam is then directed back through the first set of relay optics and into a second set of relay optics of the objective lens (step 164). The second set of relay optics directs the light beam to a second modulator block. The light beam is then further modulated by the second modulator block (step 165) which, like the first modulator block, may include multiple modulators.

The modulated light beam is then directed back through the second set of relay optics (step 166). Between the first and second sets of relay optics, the light beam is folded or redirected into the retro-focus lens including the projection optics (step 167). Finally, the projection optics project the modulated light beam onto a display or projection surface (step 168), such as the screen of a rear-projection television set.

The preceding description has been presented only to illustrate and describe embodiments of the invention. It is not intended to be exhaustive or to limit the invention to any precise form disclosed. Many modifications and variations are possible in light of the above teaching.

What is claimed is:

1. An optical assembly for a projection system comprising:
    an objective lens comprising multiple lens elements;
    a first mirror arranged with said multiple lens elements of said objective lens to receive light from a light source and direct that light off-axis through lens elements of said objective lens to one or more light modulators; and
    a retro-focus lens arranged to receive modulated light directed through said retro-focus lens by said objective lens from said one or more light modulators, wherein said retro-focus lens projects said modulated light,
    wherein said objective lens and said retro-focus lens share one or more lens elements, said retro-focus lens further comprising at least one additional lens that is different from said one or more shared lens elements.

2. The assembly of claim 1, wherein said retro-focus lens comprises a projection lens in addition to said one or more shared lens elements.

3. The assembly of claim 2, wherein said projection lens comprises a polymer material.

4. The assembly of claim 3, wherein said projection lens comprises a plastic material.

5. The assembly of claim 2, wherein said projection lens comprises two aspheric lens elements.

6. The assembly of claim 1, wherein said objective lens and said one or more shared elements consist of five singlets and one doublet.

7. The assembly of claim 6, wherein said singlets and doublet are made of glass.

8. The assembly of claim 1, comprising two lens elements that are shared by said objective lens and said retro-focus lens, wherein said two lens elements are included in both said objective lens and said retro-focus lens.

9. The assembly of claim 1, further comprising a second mirror arranged with said objective lens to split light passing off-axis through said objective lens from said first mirror such that light from said assembly is incident on at least two light modulators.

10. An optical assembly for a projection system comprising:
    means for receiving light from a light source and directing said light to and from one or more modulators, said means for receiving light comprising an objective lens; and
    means for projecting and focusing a modulated light beam received from said means for receiving light, means for projecting and focusing a modulated light beam comprising a retro-focus lens;
    wherein said objective lens and said retro-focus share one or more lens elements, but each of said objective lens and said retro-focus lens also comprise at least one other lens element that is not shared with the other of the objective or retro-focus lens.

11. The assembly of claim 10, wherein said means for projecting and focusing a modulated light beam comprises a projection lens in addition to said one or more shared lens elements.

12. The assembly of claim 11, wherein said projection lens comprises a polymer material.

13. The assembly of claim 12, wherein said projection lens comprises a plastic material.

14. The assembly of claim 11, wherein said projection lens comprises two aspheric lens elements.

15. The assembly of claim 10, wherein said first means consist of five singlets and one doublet.

16. The assembly of claim 15, wherein said singlets and doublet are made of glass.

17. The assembly of claim 10, comprising two lens elements shared by said first and second means.

18. An optical assembly for a projection system comprising:
    an objective lens comprising multiple lens elements;
    a first mirror arranged with said multiple lens elements of said objective lens to receive light from a light source and direct that light off-axis through lens elements of said objective lens to one or more light modulators; and a retro-focus lens arranged to receive modulated light directed through said retro-focus lens by said objective lens from said one or more light modulators, wherein said retro-focus lens projects said modulated light, wherein said objective lens and said retro-focus lens share one or more lens elements; and wherein said objective lens comprises two sets of optically coupled relay optics arranged such that light from said first mirror passes off-axis through a first set of relay optics to a first modulator block, ten through both sets of said relay optics to a second modulator block.

19. The assembly of claim 18, further comprising a second mirror arranged with said lens elements of said objective lens to direct light passing off-axis through a second set of said relay optics from said second modulator block through said retro-focus lens.

20. The assembly of claim 19, wherein each modulator block comprises a splitter and two light modulators optically coupled to said splitter.

21. The assembly of claim 20, wherein said splitter comprises a prism.

22. The assembly of claim 20, wherein said splitter comprises a dichroic mirror.

* * * * *

UNITED STATES PATENT AND TRADEMARK OFFICE
CERTIFICATE OF CORRECTION

| | | |
|---|---|---|
| PATENT NO. | : 7,441,909 B2 | Page 1 of 1 |
| APPLICATION NO. | : 11/040347 | |
| DATED | : October 28, 2008 | |
| INVENTOR(S) | : Scott Lerner et al. | |

It is certified that error appears in the above-identified patent and that said Letters Patent is hereby corrected as shown below:

In column 6, line 37, in Claim 10, after "light," insert -- said --.

In column 7, line 10, in Claim 18, delete "ten" and insert -- then --, therefor.

Signed and Sealed this

Twenty-first Day of July, 2009

JOHN DOLL
*Acting Director of the United States Patent and Trademark Office*